United States Patent
Carter et al.

(10) Patent No.: US 7,310,958 B2
(45) Date of Patent: Dec. 25, 2007

(54) CONTROL OF HEAT EXCHANGER OPERATION

(75) Inventors: Thomas P. Carter, Olney, MD (US);
Mark S. Huber, Sykesville, MD (US);
Frank T. Morrison, Crownsville, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 619 days.

(21) Appl. No.: 10/794,866

(22) Filed: Mar. 8, 2004

(65) Prior Publication Data
US 2005/0193750 A1   Sep. 8, 2005

(51) Int. Cl.
*F25B 19/02* (2006.01)
*F25D 3/00* (2006.01)

(52) U.S. Cl. .......................................... 62/171; 62/178
(58) Field of Classification Search ................. 62/132, 62/171, 178
See application file for complete search history.

(56) References Cited

U.S. PATENT DOCUMENTS

| | | | | |
|---|---|---|---|---|
| 4,591,988 A | * | 5/1986 | Klima et al. | 705/412 |
| 5,289,362 A | * | 2/1994 | Liebl et al. | 700/22 |
| 5,435,382 A | * | 7/1995 | Carter | 165/110 |
| 6,047,555 A | * | 4/2000 | Weng | 62/305 |
| 6,142,219 A | * | 11/2000 | Korenic et al. | 62/305 |

OTHER PUBLICATIONS

HXV Closed Circuit Hybrid Cooling Tower.

* cited by examiner

*Primary Examiner*—Chen Wen Jiang
(74) *Attorney, Agent, or Firm*—Edward J. Brosius

(57) ABSTRACT

A method of controlling the operation of a heat exchanger with evaporative and non-evaporative sections. The method includes the following steps: providing desired values of temperature or pressure; comparing present values of temperature or pressure to the desired values of temperature and pressure; and manipulating an air flowrate to the heat exchanger and load to the evaporative heat exchanger to optimize total energy and water costs while maintaining an outlet fluid at the desired temperature or pressure.

16 Claims, 14 Drawing Sheets

CONTROL OF HEAT EXCHANGER OPERATION

BACKGROUND OF INVENTION

The present invention relates to heat exchangers and, more particularly, to combine evaporative and non-evaporative heat exchangers. The evaporative section of the heat exchanger may have both a direct and indirect portion.

Waste heat from industrial processes such as condensers or heat exchangers may itself be released to the atmosphere by non-evaporative or so called dry heat exchangers. In such non-evaporative heat exchanger and air stream is in indirect contact with a process fluid stream. In a close system, the process fluid stream is enclosed so that there is no direct contact between the air stream and the process fluid stream. The enclosing structure is usually a coil of tubes. Heat is exchanged as an air stream is passed over the coil structure enclosing the process fluid stream.

Waste heat may also be rejected to the atmosphere by evaporative heat exchangers which offer significant process efficiency improvements over non-evaporative heat exchangers. One type of evaporative heat exchanger is a direct evaporative direct heat exchanger. In a direct evaporative heat exchanger, an air stream is in contact with an process fluid stream. The process fluid stream is usually water and the two streams come into direct contact with each other.

Another type of evaporative heat exchanger is an indirect close circuit evaporative heat exchanger wherein an air stream passes over an enclosed process fluid stream while an evaporative liquid also passes over the enclosed process fluid stream. The enclosed fluid exchanges heat with the evaporative liquid through indirect heat transfer, since it does not directly contact the evaporative liquid and then the air stream.

Such combined evaporative and non-evaporative heat exchangers consume energy in the form of electricity for fan and pump operation and water during the process of rejecting heat. It is desirable to operate such combined evaporative and non-evaporative heat exchangers in an efficient matter to minimize the combined consumption of energy and water. Heat rejection equipment must be selected for the maximum heat loaded summer peak air temperatures. In combined evaporative and non-evaporative heat exchangers, it is desirable to operate such heat exchangers as efficiently as possible. To date, control mechanisms for such operation have not addressed both energy savings and water savings.

SUMMARY OF THE INVENTION

It is an object of the present invention to provide a control method for operating a combined evaporative and non-evaporative heat exchanger.

It is another object of the present invention to provide an operating method for the efficient operation of a combined evaporative and non-evaporative heat exchanger wherein energy usage and water usage are minimized while meeting the heat rejection needs of the process.

It is another object of the present invention to provide a method of controlling the operation of a heat exchanger having a non-evaporative section and evaporative section such that energy use and water use are minimized.

These and other features, aspects and advantages of the present invention will become better understood with reference to the following drawings, description and claims.

DETAILED DESCRIPTION OF INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
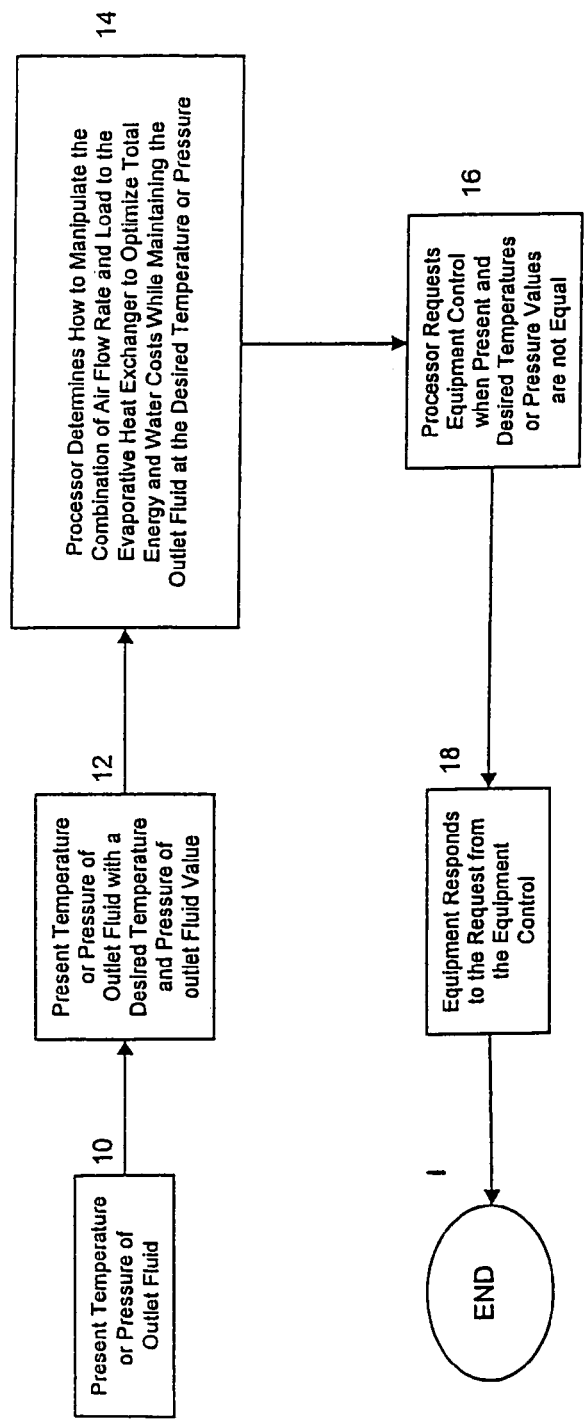
FIG. 1 is a flow chart of the control of heat exchanger operation showing the combined evaporative and non-evaporative control and optimization of combined energy and water consumption according to an embodiment of the present invention.

Referring now to FIG. 1 of the drawings shown is a flow chart of one embodiment of the present invention providing a temperature or pressure of an outlet fluid 10. A processor compares the present temperature or pressure of the outlet fluid with a desired temperature or pressure of the outlet fluid 12. The processor then determines how to manipulate the combination of air flowrate and load to an evaporative heat exchanger to optimize total energy and water costs while maintaining the outlet fluid at the desired temperature or pressure 14. Next the processor sends a request to an equipment control when present and desired temperature or pressure values are not equal 16. An operation "A" includes the steps of the processor comparing 12, the processor determining 14 and the processor requesting 16. Finally, equipment will respond to the request from the equipment control 18 when present and desired temperature or pressure values are not equal.

Figure 2:
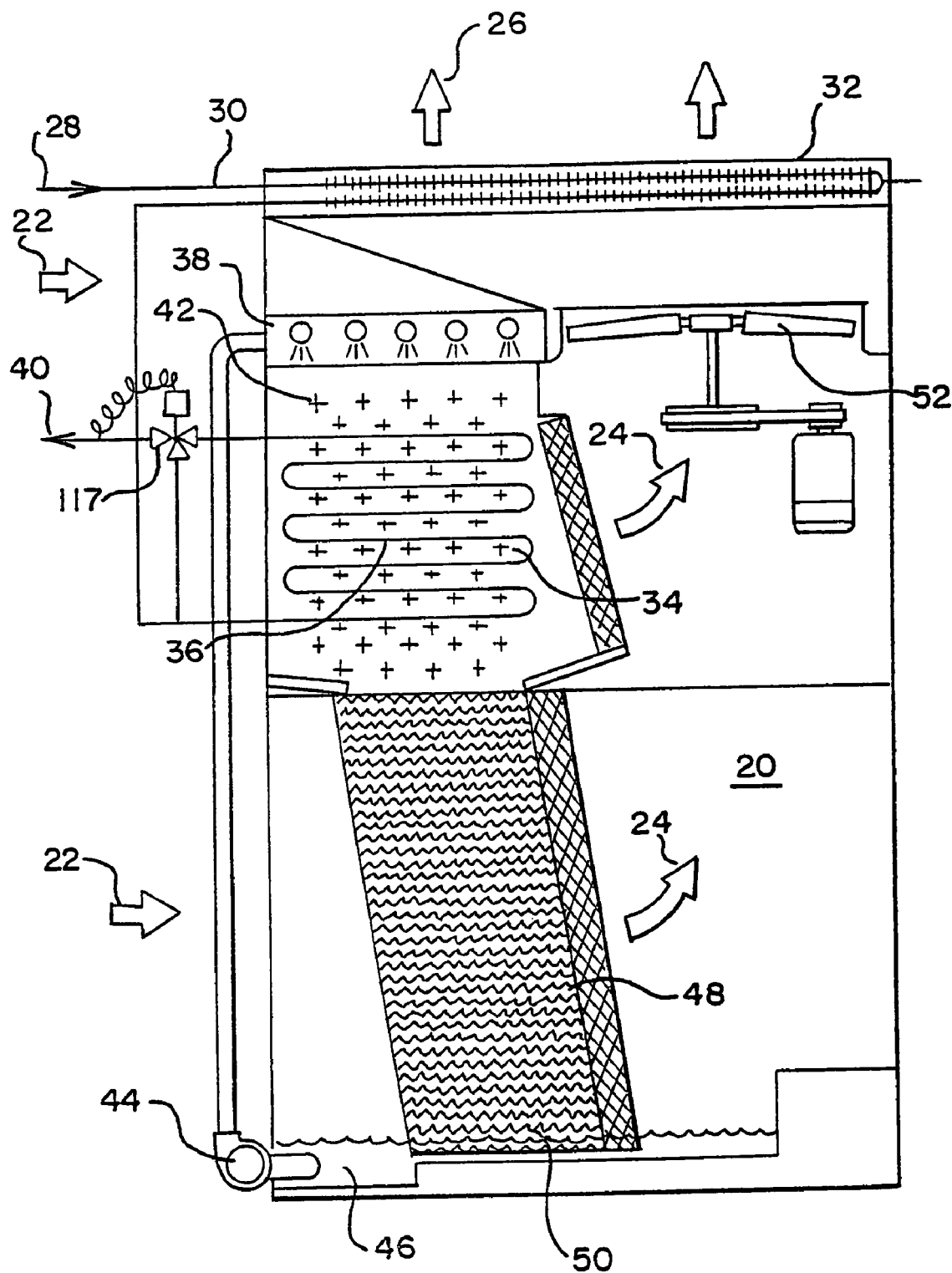
FIG. 2 is a drawing of the system showing the dry indirect, indirect evaporative and direct evaporative sections according to an embodiment of the present invention.

Referring now to FIG. 2 shown is a heat exchanger 20 of one embodiment of the present invention. Air-in 22, air flow 24 and air out 26 are shown. A fluid 28 enters the heat exchanger 20 as an inlet fluid 30 at a dry indirect section 32. The fluid 28 leaves the dry indirect section 32 and may enter an indirect evaporative section 34. The indirect section 34 contains a prime surface coil 36 and a water distribution system 38. The fluid 28 may pass through the indirect evaporative section 34 or may bypass the indirect evaporative section 34 as an outlet fluid 40. The outlet fluid 40 may be at a lower temperature than the inlet fluid 30. The water distribution system 38 may provide a spray 42 that may contact the prime surface coil 36 to improve heat transfer properties. The spray water 42 is supplied to the water distribution system 38 by a spray pump 44 and a cold water basin 46. A control 47 provides flow feed control of the fluid 28, the spray pump 44, and the axial fan 52, which in turn controls the temperature of the outlet fluid 40. The direct evaporative section 48 contains a wet deck surface 50, which provides additional heat transfer from the spray water 42 to the air flow 24. An axial fan 52 provides for the air flow 24.

Figure 3:
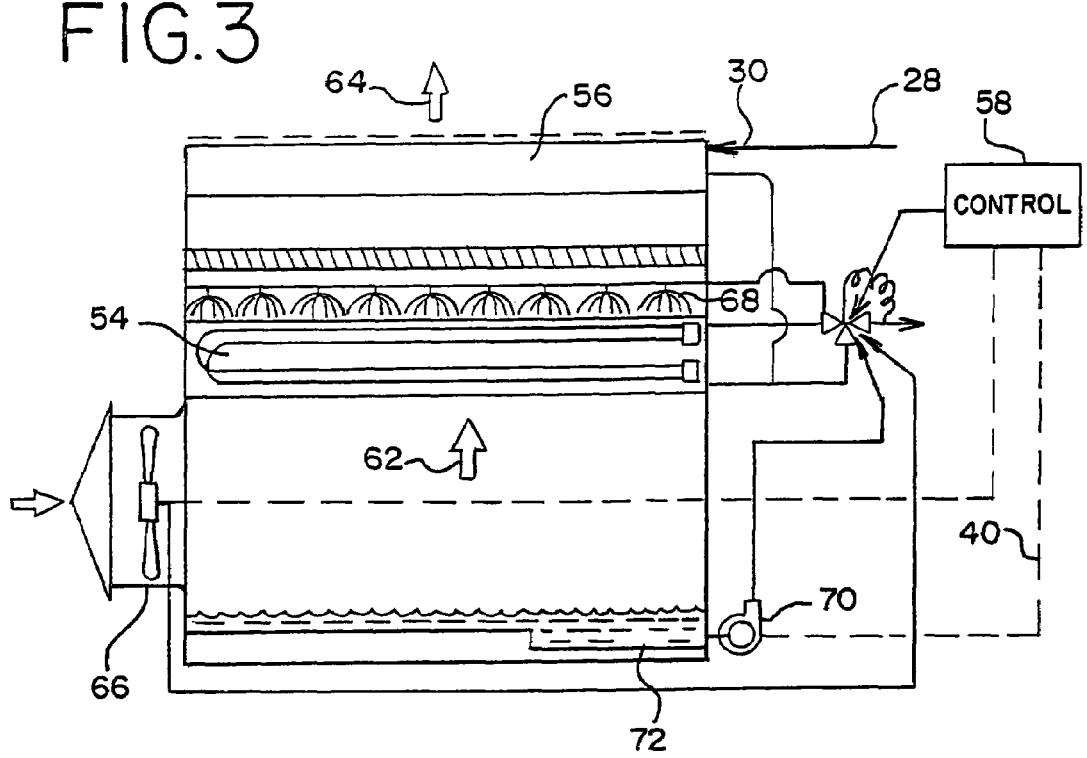
FIG. 3 is a drawing of the system showing the dry indirect, indirect evaporative and control according to another embodiment of the present invention.

Referring to FIG. 3 another embodiment of the present invention is shown without the direct evaporative section 48. This embodiment provides an indirect evaporative section 54, dry indirect section 56 and a control 58. Air-in 60, air flow 62 and air out 64 are provided by fan 66 and maybe regulated by control 58. Fluid 28 enters the dry indirect section 56 as a high temperature inlet fluid 30. The fluid 28 leaves the dry indirect section 56 and may enter an indirect evaporative section 54. The fluid 28 may bypass the indirect evaporative section 54. Control 58 provides the outlet fluid 40 from either directly exiting the dry indirect section 56 or after part or all of the fluid 28 passes through the indirect evaporative section 54. Water distribution system 70 may contain a spray pump 70 and a cold water basin 72 and may be regulated by control 58.

Figure 4:
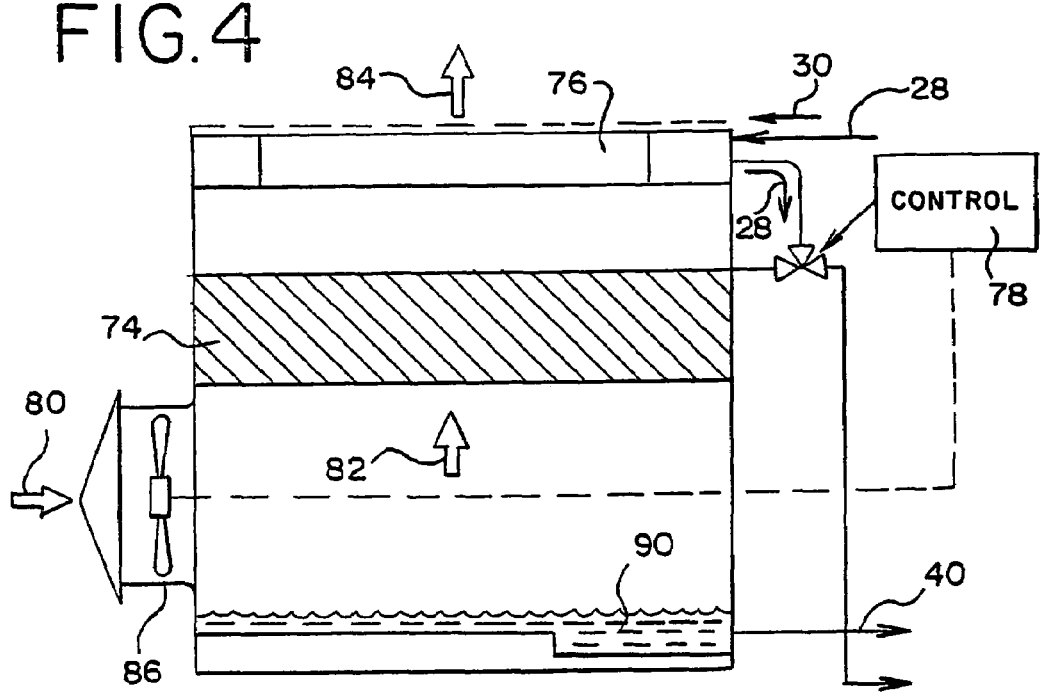
FIG. 4 is a drawing of the system showing the dry indirect section, direct evaporative section and control according to another embodiment of the present invention.

Referring to FIG. 4 another embodiment of the present invention is shown without the indirect evaporative section 54. This embodiment provides a direct evaporative section 74, dry indirect section 76 and a control 78. Air-in 80, air flow 82 and air-out 84 are provided by fan 86 and maybe regulated by control 78. Fluid 28 enters the dry indirect section 76 as a high temperature inlet fluid 30. Fluid 28 leaves the dry indirect section 76 and may enter the direct evaporative section 74 by way of control 78. Control 78 provides the outlet fluid 40 from either directly exiting the dry indirect section 76 or after part or all of the fluid 28 passes through the direct evaporative section 74.

Figure 5:
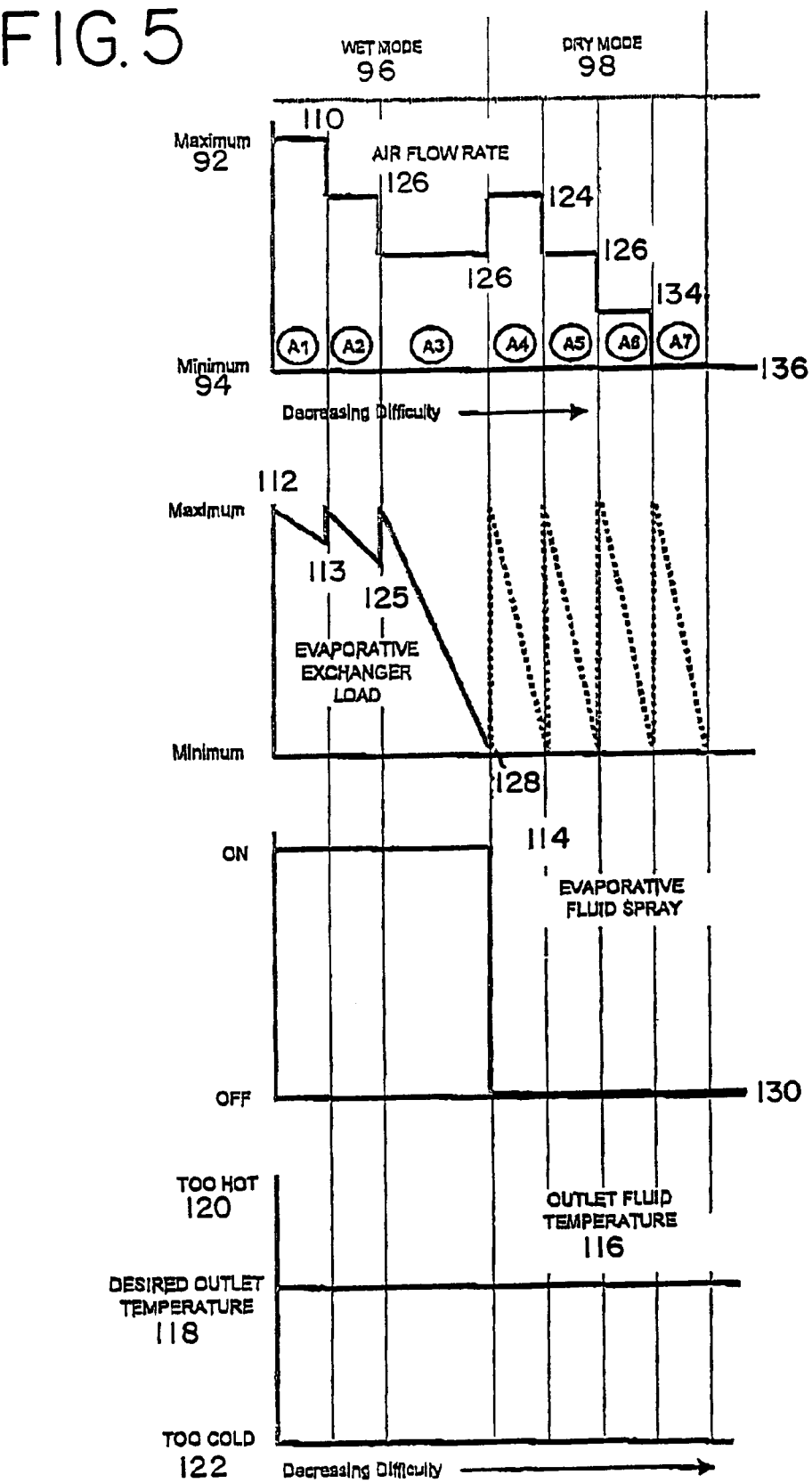
FIG. 5 is a state diagram for a dry indirect and indirect evaporative heat exchanger with 5 discrete control modes for air flowrates according to an embodiment of the present invention.

Referring to FIG. 5, in one embodiment of the present invention, state diagrams for a dry indirect and indirect evaporative heat exchanger with 5 discrete control modes for the air flowrate are shown. The top graph shows a maximum 92 and minimum 94 air flowrate. The left half of the graph is a wet mode 96 and the right side of the graph is a dry mode 98. Control state A1 is at a one-hundred percent 110 of maximum air flowrate, one-hundred percent of evaporative exchanger load 112 to ninety percent evaporative exchanger load 113 and evaporative fluid spray "on" 114. All control states A1 through A7 may be maintained at an outlet fluid temperature 116 that is equal to a desired outlet temperature 118. In all control states it is undesired to have the outlet fluid temperature 116 deviate from the desired outlet temperature 118 either in the direction of too hot 120 or too cold 122. Control state A1 is the first discrete control mode.

Control State A2 is at the second discrete control mode or seventy-five percent 124 of the maximum air flowrate. A2 is at one-hundred percent of evaporative exchanger load 112 to eighty percent evaporative exchanger load 125 and evaporative fluid spray "on" 114. Control State A3 is at the third discrete control mode or fifty percent 126 of the maximum air flowrate. A3 is at one-hundred percent of evaporative exchanger load 112 to zero percent evaporative exchanger load 128 and evaporative fluid spray "on" 114.

Control State A4 is at the second discrete air flow control mode or seventy-five percent 124 of the maximum air flowrate. A4 is at one-hundred percent of evaporative exchanger load 112 to zero percent evaporative exchanger load 128 and evaporative fluid spray "off" 130. Control State A5 is at the third discrete air flow control mode or fifty percent 126 of the maximum air flowrate. A5 is at one-hundred percent of evaporative exchanger load 112 to zero percent evaporative exchanger load 128 and evaporative fluid spray "off" 130.

Control State A6 is at the fourth discrete air flow control mode or twenty-five percent 134 of the maximum air flowrate. A6 is at one-hundred percent of evaporative exchanger load 112 to zero percent evaporative exchanger load 128 and evaporative fluid spray "off" 130. Control State A7 is at a fifth discrete air flow control mode of zero percent 136 of the maximum air flowrate. A7 is at one-hundred percent of evaporative exchanger load 112 to zero percent evaporative exchanger load 128 and evaporative fluid spray "off" 130.

Table 1 below shows an example of the control parameters for a combined indirect dry and indirect evaporative heat exchanger with five discrete control modes for air flowrate. The number of control states and the actual settings of parameters for each control state are dependent on the specific equipment controlled and operating and economic conditions.

TABLE 1

| Control State | Outlet Fluid Temp. Setpoint Low Deadband (deg F.) | Outlet Fluid Temperature Setpoint (deg F.) | Outlet Fluid Temp. Setpoint High Deadband (deg F.) | Low Limit Air Flow Rate (% of Maximum) |
|---|---|---|---|---|
| A1 | 0.5 | 90 | 0.5 | 100 |
| A2 | 0.5 | 90 | 0.5 | 75 |
| A3 | 0.5 | 90 | 0.5 | 50 |
| A4 | 0.5 | 90 | 1 | 75 |
| A5 | 0.5 | 90 | 0.5 | 50 |
| A6 | 0.5 | 90 | 0.5 | 25 |
| A7 | 0.5 | 90 | 0.5 | 0 |

Decreasing Capacity ↓

| Control State | High Limit Air Flow Rate (% of Maximum) | Low Limit Load to Evap Exchanger (% of Maximum) | High Limit Load to Evap Exchanger (% of Maximum) | Evaporative Fluid Spray |
|---|---|---|---|---|
| A1 | 100 | 90 | 100 | ON |
| A2 | 75 | 80 | 100 | ON |
| A3 | 50 | 0 | 100 | ON |
| A5 | 75 | 0 | 100 | OFF |
| A5 | 50 | 0 | 100 | OFF |
| A6 | 25 | 0 | 100 | OFF |
| A7 | 0 | 0 | 100 | OFF |

Decreasing Capacity ↓

Figure 6:
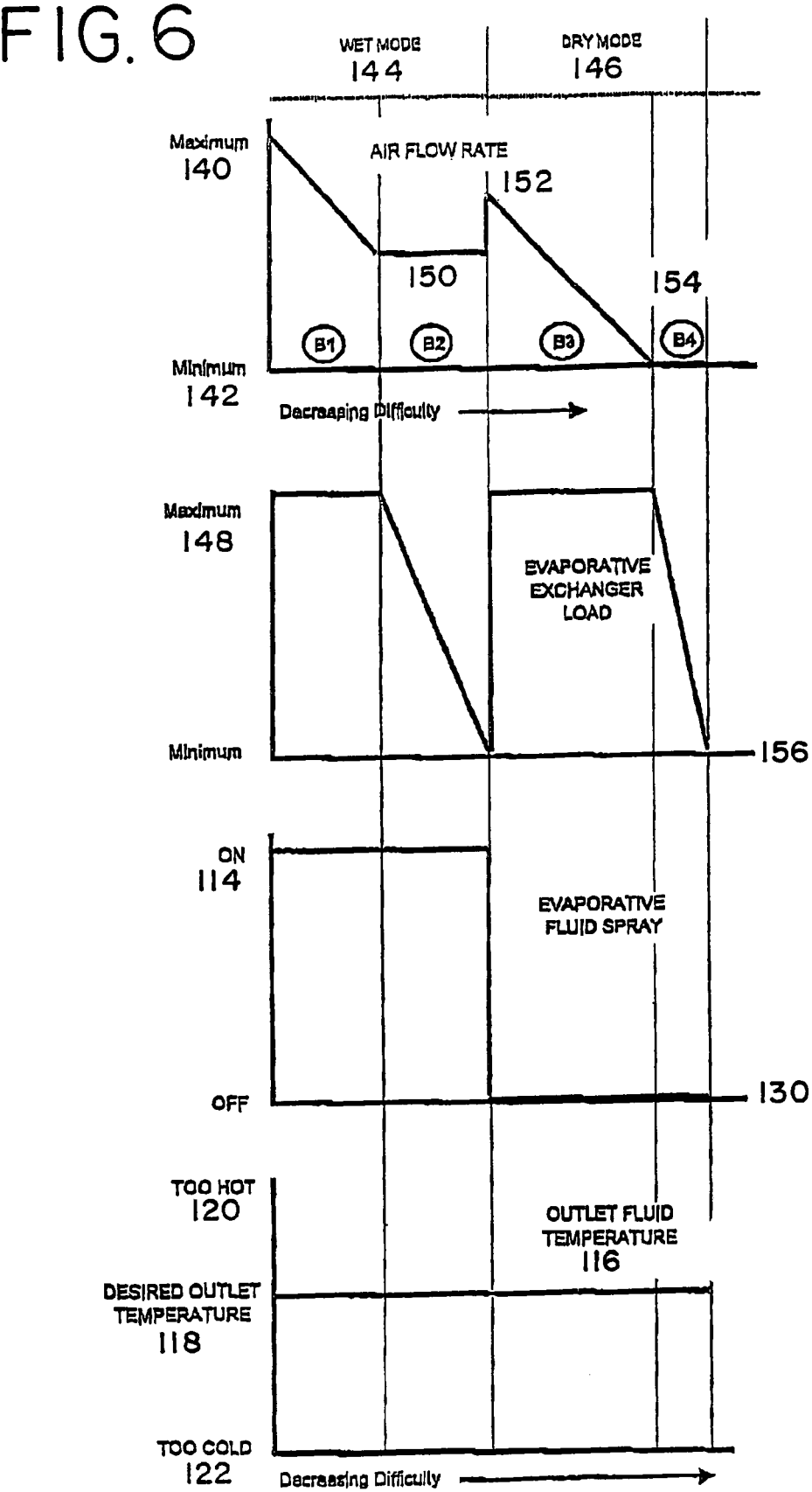
FIG. 6 is a state diagram for a dry indirect and indirect evaporative heat exchanger with continuous control of air flowrates according to an embodiment of the present invention.

Referring to FIG. 6 in one embodiment of the present invention, shown are state diagrams for dry indirect and indirect evaporative heat exchanger with continuous control of air flowrate. The top graph shows a maximum 140 and minimum 142 air flowrate. The left half of the graph is wet mode 144 and the right side of the graph is a dry mode 146. Control state B1 is at a one-hundred percent 140 to fifty percent 150 of air flowrate, one-hundred percent of evaporative exchanger load 148 and evaporative fluid spray "on" 114. All control states B1 through B4 are maintained at an outlet fluid temperature 116 at the desired outlet temperature 118. In all control states it is undesired to have the outlet fluid temperature 116 deviate from the desired outlet temperature 118 either in the direction of too hot 120 or too cold 122.

Control State B2 is at fifty percent 150 of the maximum air flowrate. B2 is at one-hundred percent of evaporative exchanger load 148 to zero percent evaporative exchanger load 156 and evaporative fluid spray "on" 114. Control State B3 is at seventy-five 152 to zero percent 154 of the maximum air flowrate. B3 is at one-hundred percent of evaporative exchanger load 148 and evaporative fluid spray "off" 130. B4 is at zero percent 154 of the maximum flow rate and from one-hundred percent 148 to zero percent 156 of the evaporative exchanger load and evaporative fluid spray "off" 130.

Table 2 below shows an example of the control parameters for a combined indirect dry and indirect evaporative heat exchanger with continuous control of air flowrate. The number of control states and the actual settings of parameters for each control state are dependent on the specific equipment controlled and operating and economic conditions.

TABLE 2

| Control State | Outlet Fluid Temp. Setpoint Low Deadband (deg F.) | Outlet Fluid Temperature Setpoint (deg F.) | Outlet Fluid Temp. Setpoint High Deadband (deg F.) | Low Limit Air Flow Rate (% of Maximum) |
|---|---|---|---|---|
| B1 | 0 | 90 | 0 | 50 |
| B2 | 0 | 90 | 0 | 50 |
| B3 | 0 | 90 | 0 | 0 |
| B4 | 0 | 90 | 0 | 0 |

Decreasing Capacity ↓

| Control State | High Limit Air Flow Rate (% of Maximum) | Low Limit Load to Evap Exchanger (% of Maximum) | High Limit Load to Evap Exchanger (% of Maximum) | Evaporative Fluid Spray |
|---|---|---|---|---|
| B1 | 100 | 100 | 100 | ON |
| B2 | 50 | 0 | 100 | ON |
| B3 | 75 | 100 | 100 | OFF |
| B4 | 0 | 0 | 100 | OFF |

Decreasing Capacity ↓

Figure 7:
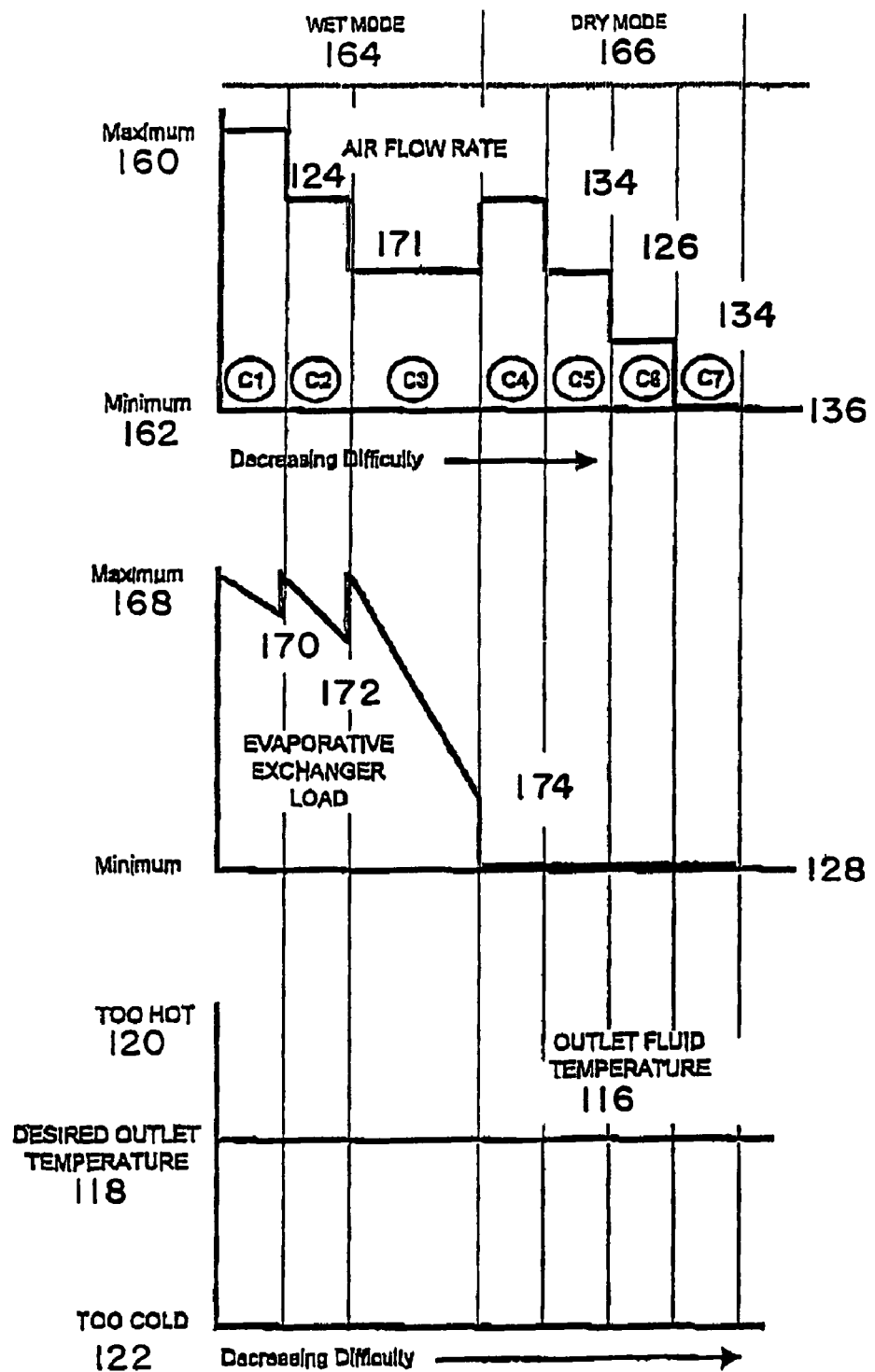
FIG. 7 is a state diagram for a dry indirect and direct evaporative heat exchanger with 5 discrete control modes of air flowrates according to an embodiment of the present invention.

Referring to FIG. 7 in one embodiment of the present invention, shown are state diagrams for dry indirect and direct evaporative heat exchanger with 5 discrete control modes for the air flowrate. The top graph shows a maximum 160 and minimum 162 air flowrate. The left half of the graph is wet mode 164 and the right side of the graph is a dry mode 166. Control state C1 is at a one-hundred percent 160 of the air flowrate, one-hundred percent of evaporative exchanger load 168 to ninety percent evaporative exchanger load 170. All control states C1 through C7 are maintained at an outlet fluid temperature 116 at the desired outlet temperature 118. In all control states it is undesired to have the outlet fluid temperature 116 deviate from the desired outlet temperature 118 either in the direction of too hot 120 or too cold 122. Control state C1 is the first discrete control mode.

Control State C2 is at the second discrete control mode or seventy-five percent 124 of the maximum air flowrate. C2 is at one-hundred percent of evaporative exchanger load 168 to eighty percent evaporative exchanger load 172. Control state C3 is at the third discrete control mode or fifty percent 171 of the maximum air flowrate. C3 is at one-hundred percent of evaporative exchanger load 168 to thirty percent evaporative exchanger load 174.

Control State C4 is at the second discrete control mode or seventy-five percent 124 of the maximum air flowrate. C4 is at zero percent of evaporative exchanger load 128.

Control State C5 is at the third discrete control mode or fifty percent 126 of the maximum air flowrate. C5 is at zero percent evaporative exchanger load 128. Control State C6 is at the fourth discrete control mode or twenty-five percent 134 of the maximum air flowrate. C6 is at zero percent evaporative exchanger load 128. Control State C7 is at the fifth discrete control mode or zero percent 136 of the maximum air flowrate. C7 is at zero percent evaporative exchanger load 128.

Table 3 below shows examples of the control parameters for a combined indirect dry and direct evaporative heat exchanger with five discrete control modes for air flowrate. The number of control states and the actual settings of parameters for each control state are dependent on the specific equipment controlled and operating and economic conditions.

Figure 8:
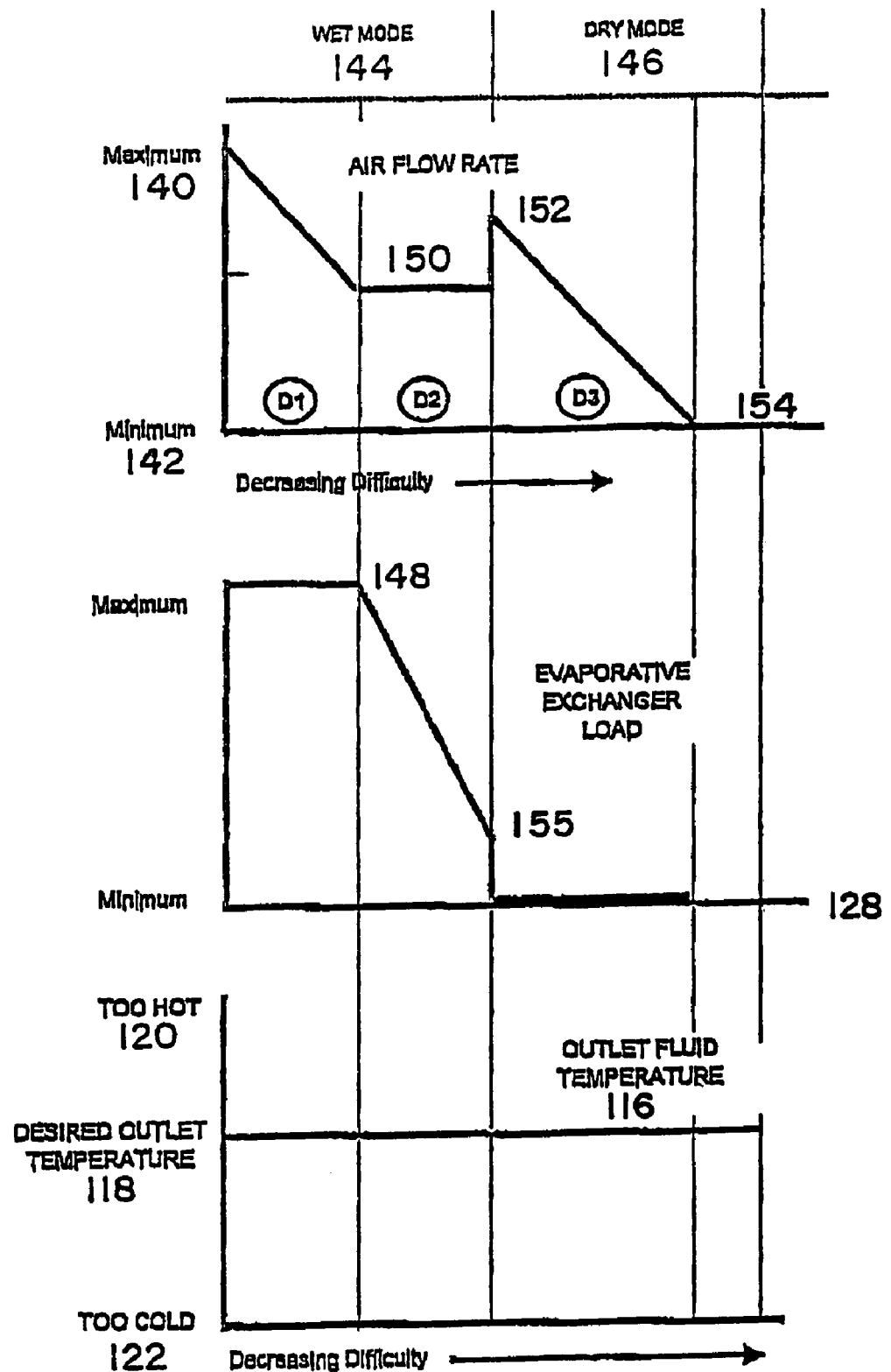
FIG. 8 is a state diagram for a dry indirect and direct evaporative heat exchanger with continuous control of air flowrates according to an embodiment of the present invention.

Referring to FIG. 8 in one embodiment of the present invention, shown are state diagrams for dry indirect and direct evaporative heat exchanger with continuous control of air flowrate. The top graph shows a maximum 140 and minimum 142 flowrate. The left half of the graph is wet mode 144 and the right side of the graph is a dry mode 146. Control state D1 is at a one-hundred percent 140 to fifty percent 150 of air flowrate, one-hundred percent of evaporative exchanger load 148. All control states D1 through D4 are maintained at an outlet fluid temperature 116 at the desired outlet temperature 118. In all control states it is undesired to have the outlet fluid temperature 116 deviate from the desired outlet temperature 118 either in the direction of too hot 120 or too cold 122.

Control State D2 is at fifty percent of the maximum air flowrate 150. D2 is at one-hundred percent of evaporative exchanger load 148 to thirty percent evaporative exchanger load 155. Control State D3 is at seventy-five 152 to zero percent 154 of the maximum air flowrate. D3 is at zero percent of evaporative exchanger load 128.

Table 4 below shows an example of the control parameters for a combined indirect dry and direct evaporative heat exchanger with continuous control of air flowrate. The number of control states and the actual settings of parameters for each control state are dependent on the specific equipment controlled and operating and economic conditions.

TABLE 3

| Control State | Outlet Fluid Temp. Setpoint Low Deadband (deg F.) | Outlet Fluid Temperature Setpoint (deg F.) | Outlet Fluid Temp. Setpoint High Deadband (deg F.) | Low Limit Air Flow Rate (% of Maximum) |
|---|---|---|---|---|
| C1 | 0.5 | 85 | 0.5 | 100 |
| C2 | 0.5 | 85 | 0.5 | 75 |
| C3 | 0.5 | 85 | 0.5 | 50 |
| C4 | 0.5 | 85 | 1 | 75 |
| C5 | 0.5 | 85 | 0.5 | 50 |
| C6 | 0.5 | 85 | 0.5 | 25 |
| C7 | 0.5 | 85 | 0.5 | 0 |

| Control State | High Limit Air Flow Rate (% of Maximum) | Low Limit Load to Evap Exchanger (% of Maximum) | High Limit Load to Evap Exchanger (% of Maximum) | Evaporative Fluid Spray |
|---|---|---|---|---|
| C1 | 100 | 90 | 100 | N/A |
| C2 | 75 | 80 | 100 | N/A |
| C3 | 50 | 30 | 100 | N/A |
| C4 | 75 | 0 | 0 | N/A |
| C5 | 50 | 0 | 0 | N/A |
| C6 | 25 | 0 | 0 | N/A |
| C7 | 0 | 0 | 0 | N/A |

(Decreasing Capacity ↓)

TABLE 4

| Control State | Outlet Fluid Temp. Setpoint Low Deadband (deg F.) | Outlet Fluid Temperature Setpoint (deg F.) | Outlet Fluid Temp. Setpoint High Deadband (deg F.) | Low Limit Air Flow Rate (% of Maximum) |
|---|---|---|---|---|
| D1 | 0 | 85 | 0 | 50 |
| D2 | 0 | 85 | 0 | 50 |
| D3 | 0 | 85 | 0 | 0 |

| Control State | High Limit Air Flow Rate (% of Maximum) | Low Limit Load to Evap Exchanger (% of Maximum) | High Limit Load to Evap Exchanger (% of Maximum) | Evaporative Fluid Spray |
|---|---|---|---|---|
| D1 | 100 | 100 | 100 | N/A |
| D2 | 50 | 30 | 100 | N/A |
| D3 | 75 | 0 | 0 | N/A |

(Decreasing Capacity ↓)

Figure 9:
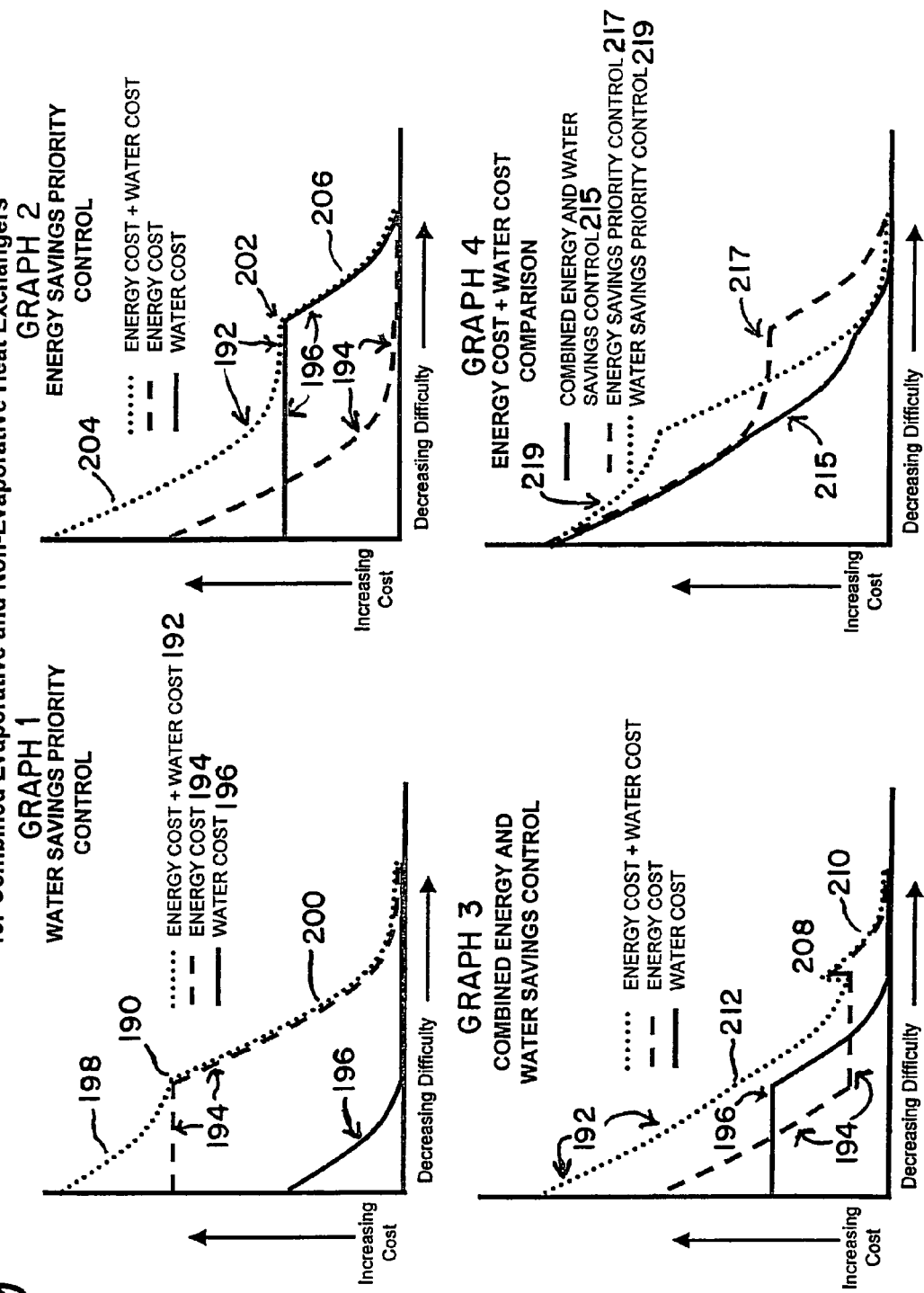
FIG. 9 shows graphs comparing the different control strategies as increasing cost verses decreasing difficulty according to an embodiment of the present invention.

Referring to FIG. 9 as in one embodiment of the present invention, shown are cost comparison graphs associated with control strategies for combined evaporative and non-evaporative heat exchanger. Graphs 1-4 all show increasing cost on the vertical axis and decreasing difficulty on the horizontal axis. With a water savings priority control strategy Graph 1 shows that before point 190 the energy+water cost 192 is the sum of both costs 198. Provided are curves for energy cost+water cost 192, energy cost 194 and water cost 196. Graph 2 shows an energy savings as the priority for the control. Provided are curves for energy cost+water cost 192, energy cost 194 and water cost 196. To the right of point 202 the energy cost+water cost 192 is equal to the water cost 206. To the left of point 202 the energy+water cost is the sum of both costs 204.

Figure 10:
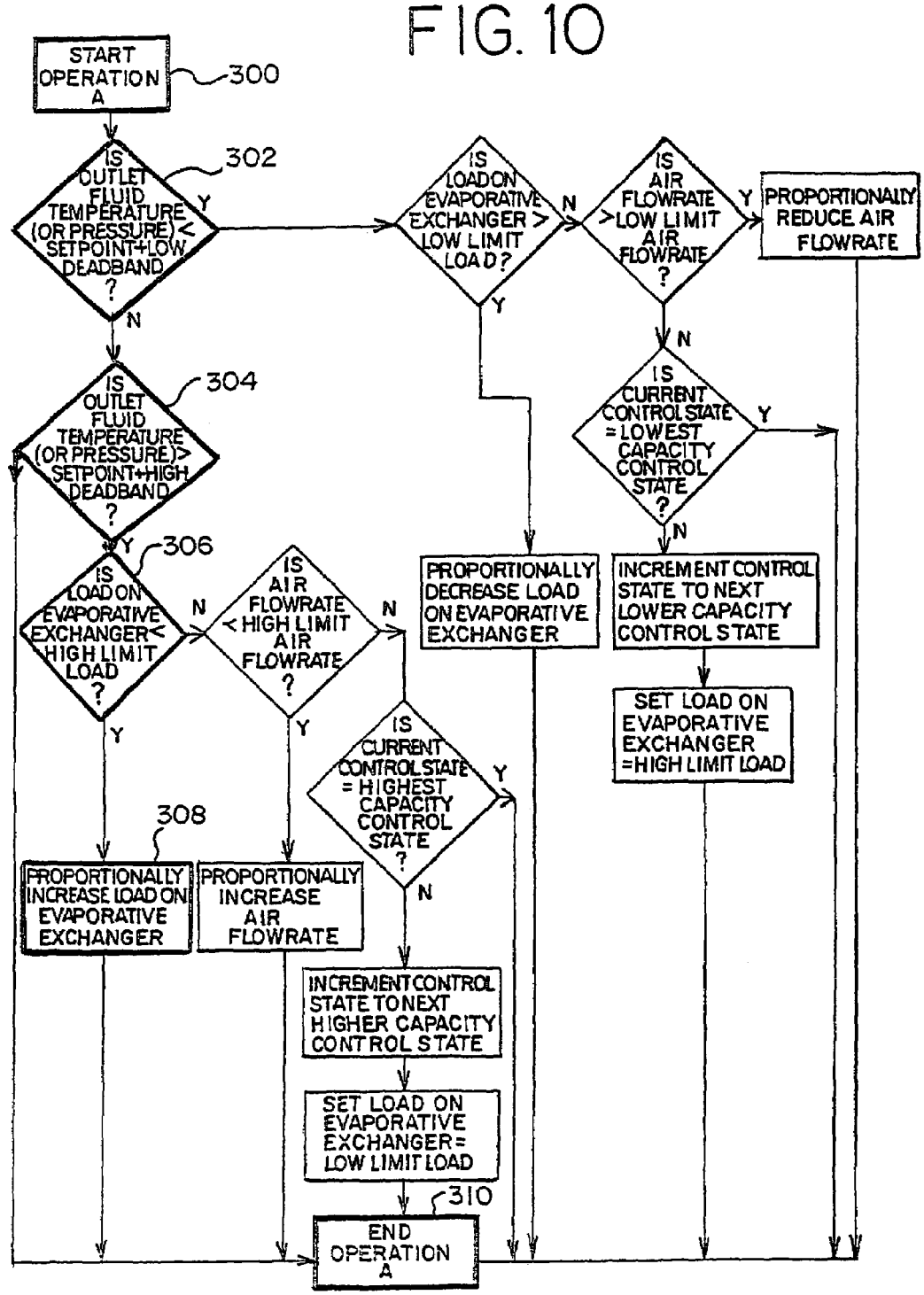
FIG. 10 shows a flow chart of control states A1-A7, B2, B4, C1-C7 or D2 with increasing outlet fluid temperature or pressure according to an embodiment of the present invention.

Graph 3 shows a combined energy and water savings control strategy. Provided are curves for energy cost+water cost 192, energy cost 194 and water cost 196. To the right of point 208 the energy+water cost is the same as the energy cost only 210. To the left of point 208 the energy+water cost is the sum of both energy cost and water cost 212. Graph 4 shows energy cost+water cost comparison of the three control methods. Provided are combined energy and water savings control 215, energy savings control 217 and water savings priority control 219. The combined energy and water savings control 215 has the lowest cost. Referring to FIG. 10 as in one embodiment of the present invention, shown is a flow chart of the overall control with highlighted control states for A1-A7, B2, B4, C1-C7 and D2 with increasing outlet fluid temperature or pressure. Start operation "A" 300 is shown. Condition outlet fluid temperature or pressure less than setpoint minus low deadband 302 value is provided and answered "N" or no. Condition is outlet fluid temperature or pressure greater than setpoint plus high deadband 304 values is provided and answered "Y" or yes. Condition is load evaporative exchanger less than high limit load is provided and answered "Y" or yes. Step proportionally increase load on evaporative exchanger 308 is provided and finally end operation "A" 310.

Figure 11:
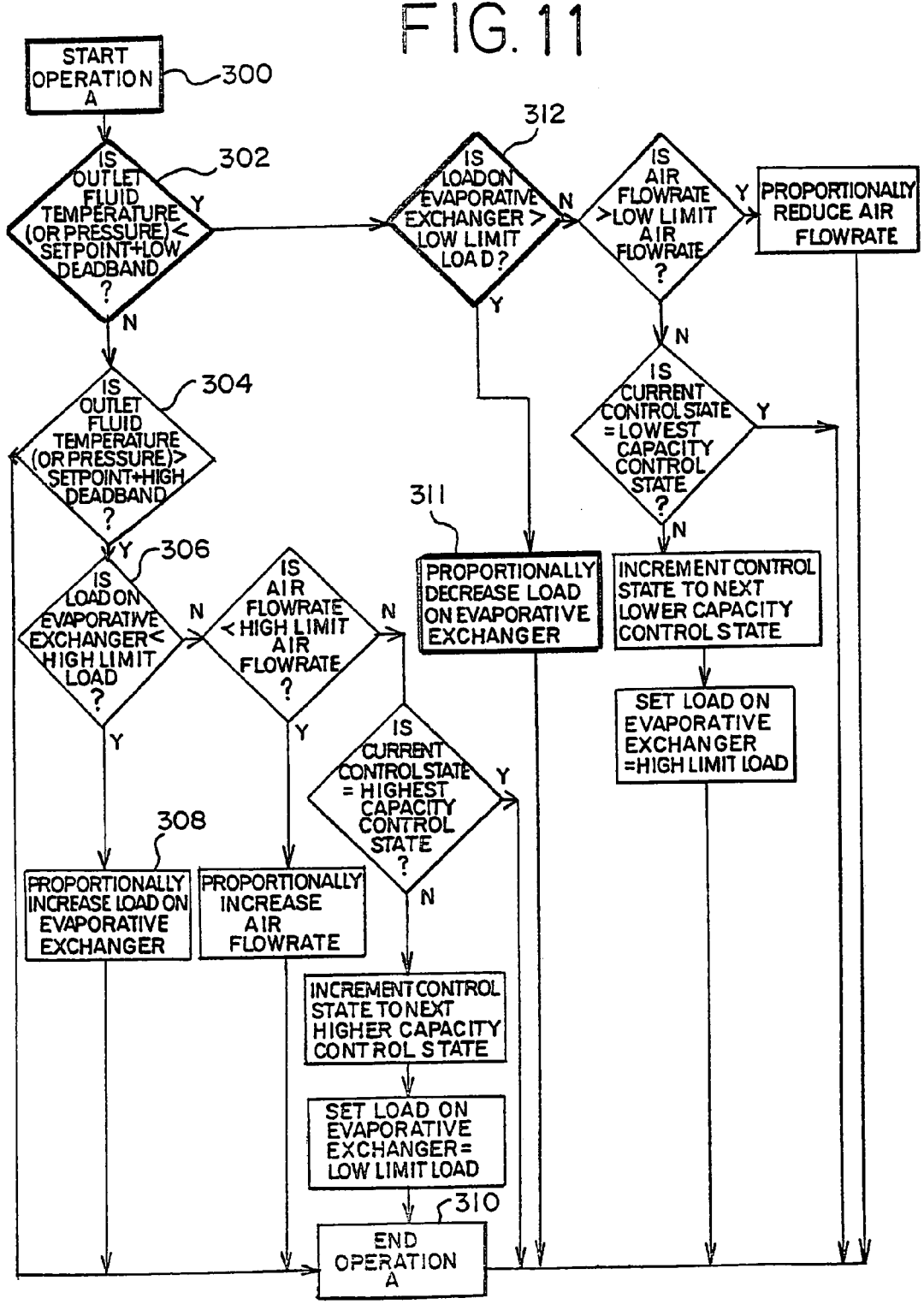
FIG. 11 shows a flow chart of control states A1-A7, B2, B4, C1-C7 or D2 with decreasing outlet fluid temperature or pressure according to an embodiment of the present invention.

Referring to FIG. 11 as in one embodiment of the present invention, shown is a flow chart of the overall control with highlighted control states for A1-A7, B2, B4, C1-C7 and D2 with decreasing outlet fluid temperature or pressure. Start operation "A" 300 is shown. Condition outlet fluid temperature or pressure less than setpoint minus low deadband 302 value is provided and answered "Y" or yes.

Condition is load on evaporative exchanger greater than low limit load 312 is provided and answered "Y" or yes. Proportionally decrease load on evaporative exchanger 311 is provided and finally end operation "A" 310.

Figure 12:
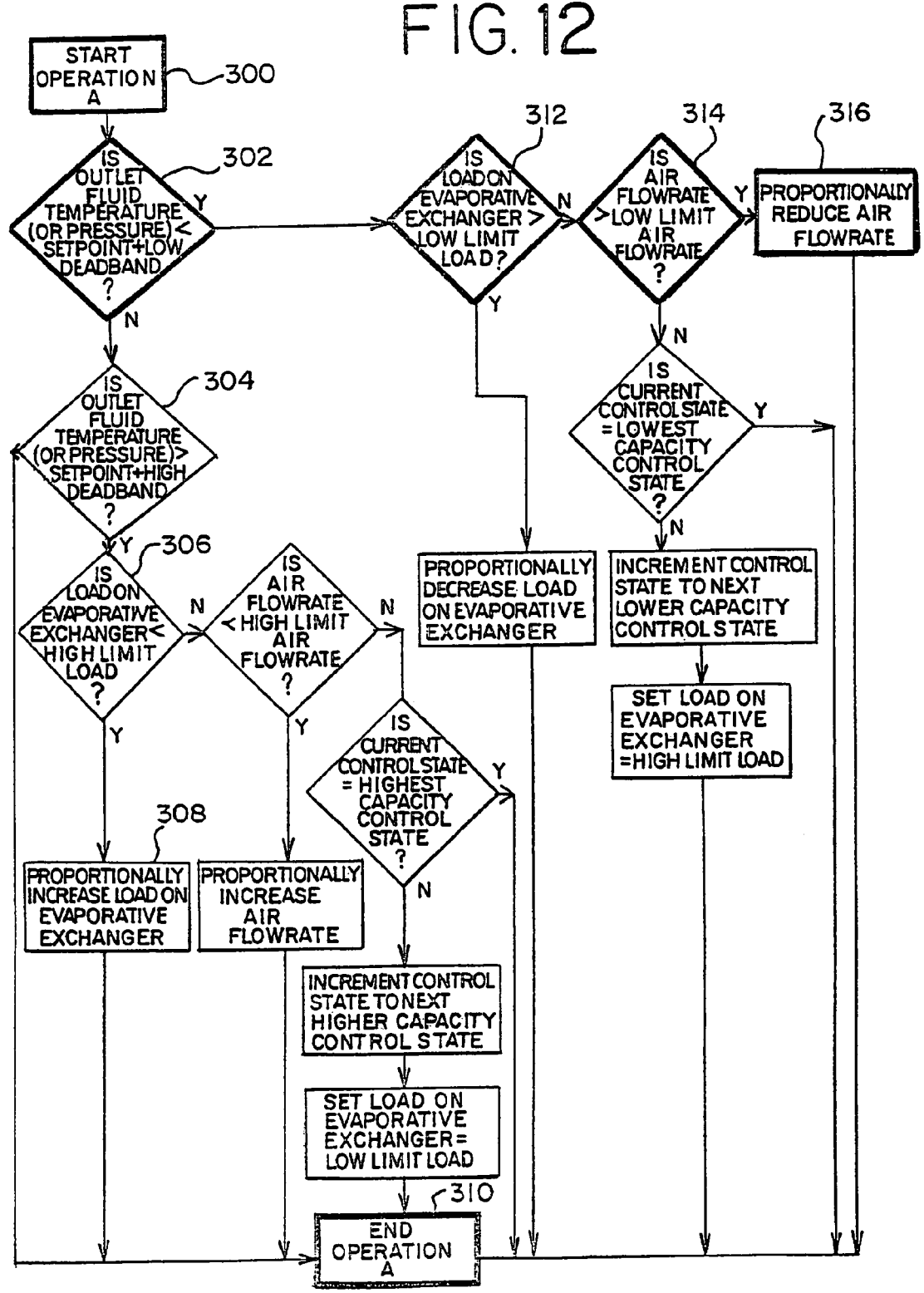
FIG. 12 shows a flow chart of control states B1, B3, D1, or D3 with decreasing outlet fluid temperature or pressure according to an embodiment of the present invention.

Referring to FIG. 12 as in one embodiment of the present invention, shown is a flow chart of the overall control with highlighted control states for B1, B3, D1 and D3 with decreasing outlet fluid temperature or pressure. Start operation "A" 300 is shown. Condition outlet fluid temperature or pressure less than setpoint minus low deadband 302 value is provided and answered "Y" or yes.

Condition is load on evaporative exchanger greater than low limit load 312 is provided and answered "N" or no. Condition is flowrate greater than low limit air flowrate 314 is provides and answered "Y" or yes. Proportionally reduce air flowrate 316 and finally end operation "A" 310.

Figure 13:
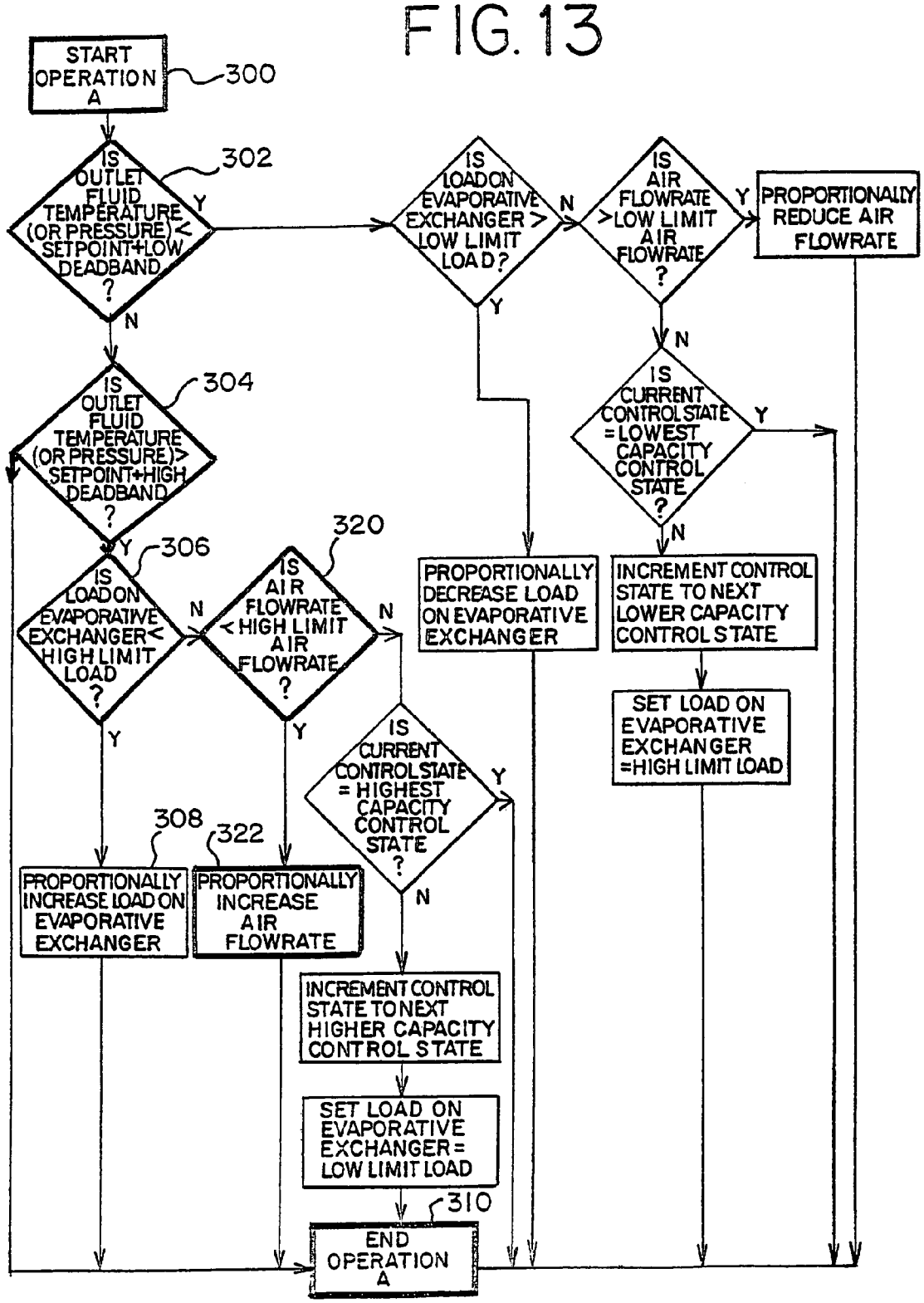
FIG. 13 shows a flow chart of control states B1, B3, D1, or D3 with increasing outlet fluid temperature or pressure according to an embodiment of the present invention.

Referring to FIG. 13 as in one embodiment of the present invention, shown is a flow chart of the overall control with highlighted control states for B1, B3, D1 and D3 with increasing outlet fluid temperature or pressure. Start operation "A" 300 is shown. Condition outlet fluid temperature or pressure less than setpoint minus low deadband 302 value is provided and answered "N" or no.

Condition is outlet fluid temperature or pressure greater than setpoint plus high deadband 304 values is provided and answered "Y" or yes. Condition is load evaporative exchanger less than high limit load 306 is provided and answered "N" or no. Condition is air flowrate less than high limit air flowrate 320 is provided and answered "Y" or yes. Step proportionally increase air flowrate 322 is provided and finally end operation "A" 310.

Figure 14:
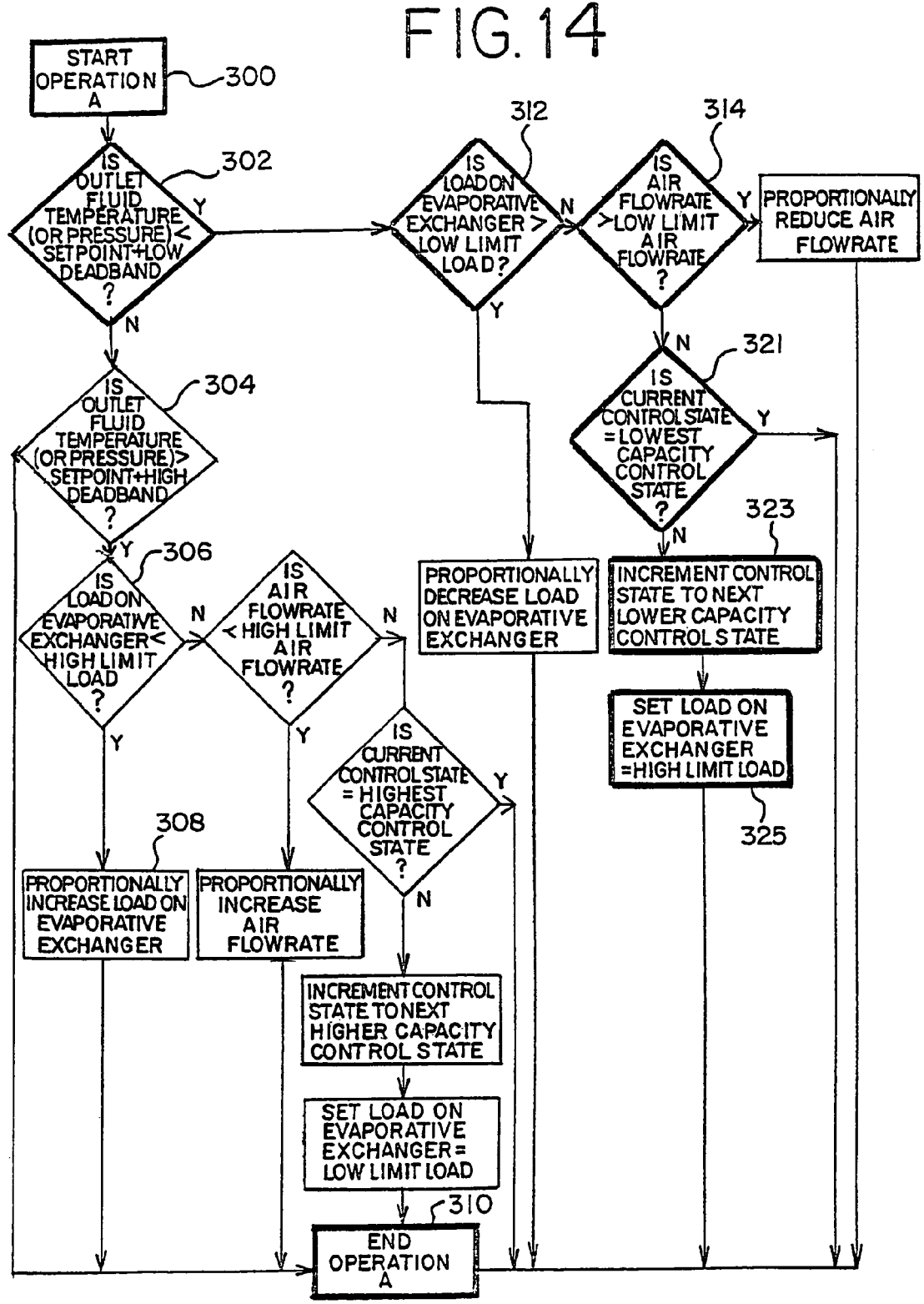
FIG. 14 shows a flow chart of control states switching from A1 to A2, A2 to A3, A3 to A4, A5 to A6, A6 to A7, B1 to B2, B2 to B3, B3 to B4, C1 to C2, C2 to C3, C3 to C4, C4 to C5, C5 to C6, C6 to C7, D1 to D2, or D2 to D3 according to an embodiment of the present invention.

Referring to FIG. 14 as in one embodiment of the present invention, shown is a flow chart of the overall control with highlighted control states for switching from A1-A2, A2-A3, A3-A4, A4-A5, A5-A6, A6-A7, B1-B2, B2-B3, B3-B4, C1-C2, C2-C3, C3-C4, C4-C5, C5-C6, C6-C7, D1-D2 and D2-D3. Start operation "A" 300 is shown. Condition outlet fluid temperature or pressure less than setpoint minus low deadband 302 value is provided and answered "Y" or yes.

Condition is load on evaporative exchanger greater than low limit load 312 is provided and answered "N" or no.

Condition is air flowrate greater than low limit air flowrate 314 is provided and answered "N" or no. Condition is current control state equal to lowest capacity control state 321 is provided and answered "N" or no. Increment control state to next lower capacity control state is provided 323. Set load on evaporative exchanger equal to high limit load 325 is provided and finally end operation "A" 310.

Figure 15:
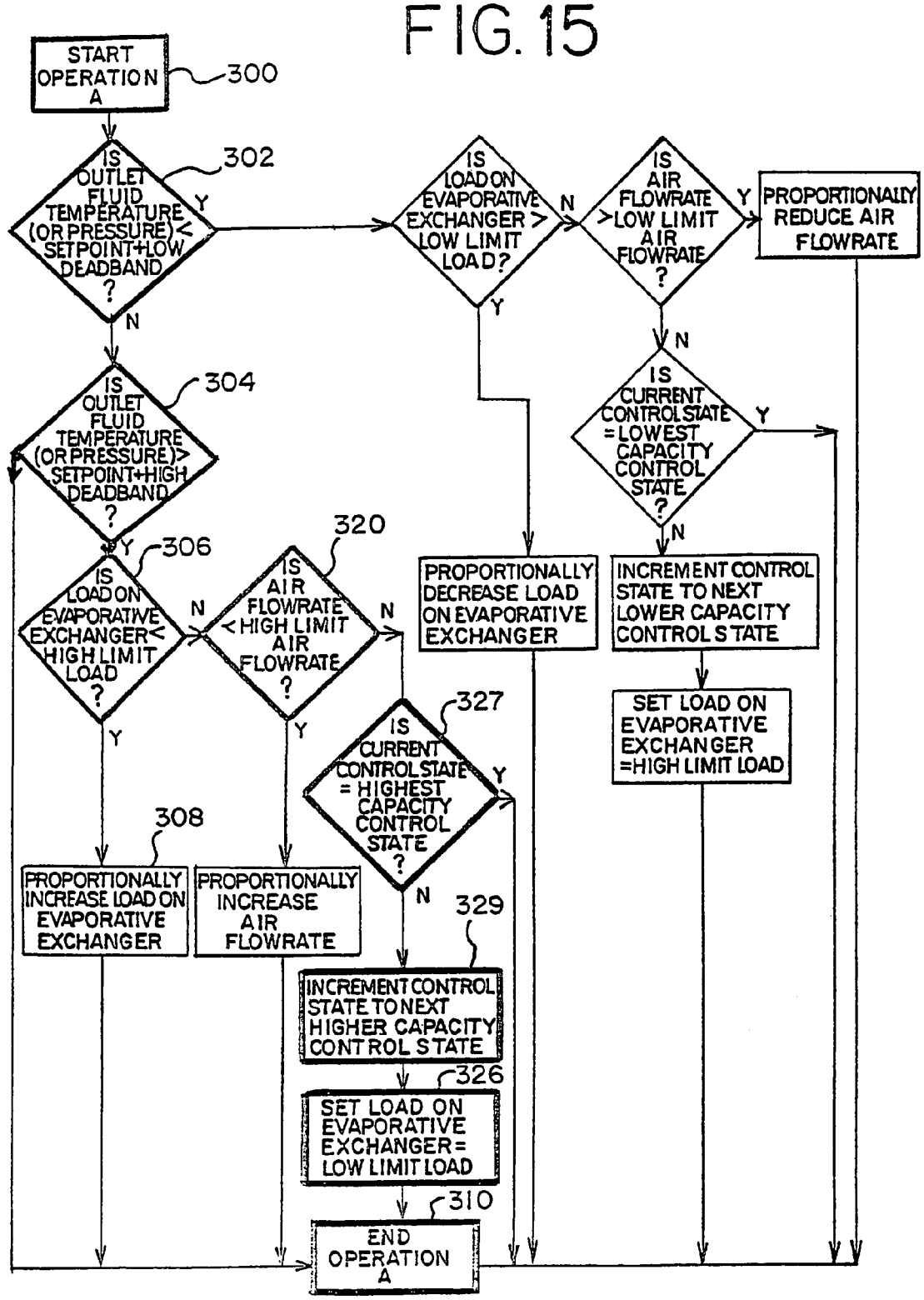
FIG. 15 shows a flow chart of control states switching from A7 to A6, A6 to A5, A5 to A4, A4 to A3, A3 to A2, A2 to A1, B4 to B3, B3 to B2, B2 to B1, C7 to C6, C6 to C5, C5 to C4, C4 to C3, C3 to C2, C2 to C1, D3 to D2, or D2 to D1 according to an embodiment of the present invention.

Referring to FIG. 15 as in one embodiment of the present invention, shown is a flow chart of the overall control with highlighted control states switching from A7-A6, A6-A5, A5-A4, A4-A3, A3-A2, A2-A1, B4-B3, B3-B2, B2-B1, C7-C6, C6-C5, C5-C4, C4-C3, C3-C2, C2-C1, D3-D2 and D2-D1. Start operation "A" 300 is shown. Condition outlet fluid temperature or pressure less than setpoint minus low dead band 302 value is provided and answered "N" or no.

Condition is outlet fluid temperature or pressure greater than setpoint plus high deadband 304 values is provided and answered "Y" or yes. Condition is load evaporative exchanger less than high limit load 306 is provided and answered "N" or no. Condition is air flowrate less than high limit air flowrate 320 is provided and answered "N" or no. Condition is current control state equal to highest capacity control state 327 is provided and is answered "N" or no. The step of increment control state to next higher capacity control state 329 is provided. The step of set load on evaporative exchange is equal to low limit load 326 is provided and end operation "A" 310.

It should be understood that the foregoing relates to preferred embodiments of the invention and that modifications may be made without departing from the spirit and scope of the invention as set forth in the following claim.

What is claimed is:

1. A method of controlling the operation of a heat exchanger having a dry, non-evaporative section and an evaporative section comprising the steps of:
   sensing whether a water spray is on in the evaporative section, establishing that the water spray is on,
   comparing fan output to a predetermined energy switch fan output, if the fan output exceeds the predetermined energy switch fan output, comparing outlet fluid temperature to a predetermined set point temperature,
   and reducing fan output if the outlet fluid temperature is less than the set point temperature,
   sensing whether the water spray is on and establishing that the water spray is on,
   comparing fan output to a predetermined energy switch fan output and setting the fan speed to about equal the energy switch fan output,
   comparing the outlet fluid temperature to a predetermined set point temperature,
   and reducing fluid flow to the evaporative section if the outlet fluid temperature is less than the set point temperature.

2. The method of claim 1 further comprising the steps of:
   sensing whether the water spray is on and established that the water spray is on,
   comparing the outlet fluid temperature to a predetermined set point temperature,
   and stopping the water spray in the evaporative section if the outlet fluid temperature is less than the set point temperature.

3. The method of claim 2 further comprising the steps of:
   sensing whether the water spray is on and establishing that the water spray is off,
   comparing the outlet fluid temperature to a predetermined set point temperature,
   and decreasing the fan output if the outlet temperature is less than the set point temperature.

4. A method of controlling the operation of a heat exchanger having a dry, non-evaporative section and an evaporative section comprising the steps of:
   sensing whether the water spray is on and establishing that the water spray is off,
   comparing the outlet fluid temperature to a predetermined set point temperature, and increasing fan output if the outlet fluid temperature is greater than the set point temperature,
   comparing the fan output to the energy switch fan output plus a dead band output prior to increasing the fan output and increasing the fan output only if the fan output is less than the energy switch fan output plus the dead band output.

5. A method of controlling the operation of a heat exchanger having a non-evaporative section and an evaporative section, wherein the evaporative section includes a water spray, and a fan assembly control air flow across both the non-evaporative section and the evaporative section, and a process fluid follow a path through the non-evaporative section or an indirect portion of the evaporative section or both, comprising the steps of:
   sensing that the water spray is on in the evaporative section,
   sensing that fan output is greater than the water spray is on in the evaporative section,
   sensing that process fluid outlet temperature is less than a predetermined set point temperature, and reducing fan output,
   sensing that the fan output is less than a predetermined energy switch fan output, setting the fan output to about equal the predetermined energy switch fan output,
   sensing that the process fluid outlet temperature is less than a predetermined set point temperature,
   and reducing process fluid flow to the indirect portion of the evaporative section.

6. The method of claim 5 further comprising the steps of:
   sensing that the process fluid outlet temperature is less than a predetermined set point temperature,
   sensing that process fluid flow to the indirect section of the evaporative section has been reduced to zero,
   and stopping the water spray in the evaporative section.

7. The method of claim 6 further comprising the steps of:
   sensing that the water spray has not been stopped for a preset time period prior to stopping the water spray.

8. The method of claim 6 further comprising the steps of:
   sensing that the water spray is off,
   sensing that the process fluid outlet temperature is greater than a predetermined set point temperature,
   and increasing fan output proportionally.

9. The method of claim 6 further comprising the steps of:
   sensing that the water spray is off,
   sensing that the process fluid outlet temperature is less than a predetermined set point temperature,
   and decreasing fan output proportionally.

10. A method of a controlling operation of a heat exchanger having a non-evaporative section and an evaporative section, wherein the evaporative section includes a water spray, and a fan assembly controls air flow across both the non-evaporative section and the evaporative section,
    and a process fluid follows a flow path through the non-evaporative section or an indirect portion of the evaporative section or both, comprising the steps of:
    sensing that the water spray is off in the evaporative section, sensing that the process fluid outlet temperature is greater than a predetermined set point temperature,
and increasing fan output,
sensing that the fan output is less than a predetermined energy switch fan output plus a dead band output prior to the increasing the fan output.

11. A method of controlling the operation of a heat exchanger having a non-evaporative section and an evaporative section,
wherein the evaporative section includes a water spray, and a fan assembly controls and flow across both the non-evaporative section and the evaporative section,
and a process fluid follows a flow path through the non-evaporative section or an indirect portion of the evaporative section or both, comprising the steps of:
sensing that the water spray is on in the evaporative section,
sensing that the fan output is less than a predetermined energy switch fan output,
sensing that the process fluid outlet temperature is greater than a predetermined set point temperature,
and increasing process fluid flow through the indirect portion of the evaporative section,
setting the fan output to about equal the predetermined energy switch fan output prior to sensing the process fluid outlet temperature.

12. The method of claim 11 further comprising the steps of:
sensing that the process fluid outlet temperatures is greater than a predetermined set point temperature,
sensing that process fluid flow in fully through the indirect portion of the evaporative section,
and increasing the fan output proportionally.

13. The method of claim 12 further comprising the steps of:
sensing that the fan output is greater than the predetermined energy switch fan output,
sensing that the process fluid outlet temperature is greater than a predetermined set point temperature,
and increasing fan output proportionally.

14. A method of controlling the operation of a heat exchanger having a dry, non-evaporative section and an evaporative section comprising the steps of;

Sensing whether the water spray is on and establishing that the water spray is off,
comparing the outlet fluid temperature to a predetermined set point temperature, and increasing fan output if the outlet fluid temperature is greater than the set point temperature,
sensing whether the water spray is on and establishing that the water spray is off,
comparing the outlet fluid temperature to a set point temperature and if the outlet fluid temperature is greater than the set point temperature, comparing the fan speed to the energy switch fan speed plus a dead band speed and starting the water spray if the fan speed is less than the energy switch fan speed plus the dead band speed.

15. The method of claim 14 further comprising the steps of:
sensing whether the water spray is on and establishing that the water spray is on,
comparing fan output to a predetermined energy switch fan output,
if the fan output exceeds the predetermined energy switch fan output, comparing the outlet fluid temperature to a predetermined set point temperature,
and increasing fan output if the outlet fluid temperature is greater than the set point temperature.

16. A method of controlling operation of a heat exchanger having a non-evaporative section and an evaporative section, wherein the evaporative section includes a water spray, and a fan assembly controls air flow across both the non-evaporative section and the evaporative section,
sensing that the water spray is off in the evaporative section, sensing that the process fluid outlet temperature is greater than a predetermined set point temperature,
sensing that fan output is greater than a predetermined energy switch fan output plus a dead band output,
and starting the water spray in the evaporative section.

* * * * *